(12) United States Patent
Wattellier et al.

(10) Patent No.: US 9,435,447 B2
(45) Date of Patent: Sep. 6, 2016

(54) DIRECTIONAL CONTROL VALVE FOR FLUID AND DEVICE FOR IN-SITU RECONSTITUTION AND ADMINISTERING

(71) Applicant: EVEON, Montbonnot Saint Martin (FR)

(72) Inventors: Arnaud Wattellier, Laval (FR); Christophe Dehan, Saint Ismier (FR)

(73) Assignee: EVEON, Montbonnot Saint Martin (FR)

( * ) Notice: Subject to any disclaimer, the term of this patent is extended or adjusted under 35 U.S.C. 154(b) by 36 days.

(21) Appl. No.: 14/410,906

(22) PCT Filed: May 14, 2013

(86) PCT No.: PCT/FR2013/051047
§ 371 (c)(1),
(2) Date: Dec. 23, 2014

(87) PCT Pub. No.: WO2014/016479
PCT Pub. Date: Jan. 30, 2014

(65) Prior Publication Data
US 2015/0204451 A1    Jul. 23, 2015

(30) Foreign Application Priority Data
Jul. 27, 2012    (FR) ..................................... 12 57291

(51) Int. Cl.
*F16K 11/076*    (2006.01)
*B01F 5/10*    (2006.01)
*F16K 11/085*    (2006.01)

(52) U.S. Cl.
CPC .............. *F16K 11/076* (2013.01); *B01F 5/10* (2013.01); *F16K 11/085* (2013.01); *F16K 11/0856* (2013.01); *B01F 2215/0037* (2013.01); *Y10T 137/8671* (2015.04); *Y10T 137/87249* (2015.04)

(58) Field of Classification Search
CPC .............. F16K 11/076; F16K 11/085; F16K 11/0856; B01F 5/10; B01F 2215/0037; Y10T 137/8671; Y10T 137/86863; Y10T 137/86871; Y10T 137/86558; Y10T 137/86566; Y10T 137/87153; Y10T 137/87161; Y10T 137/87249
USPC ............ 137/625.69, 625.46, 625.47, 625.18, 137/625.19, 594, 595, 597; 251/310, 311
See application file for complete search history.

(56) References Cited

U.S. PATENT DOCUMENTS

| | | | | |
|---|---|---|---|---|
| 4,156,438 A | * | 5/1979 | Kiesow | F16K 11/083 137/625.41 |
| 4,574,840 A | * | 3/1986 | Schumann | F16K 11/0856 137/625.15 |
| 6,153,101 A | * | 11/2000 | Schafer | G01N 30/96 210/198.2 |
| 6,427,713 B1 | | 8/2002 | Dempsey et al. | |
| 6,802,970 B2 | * | 10/2004 | Rochette | B01J 47/00 210/264 |
| 2003/0196713 A1 | * | 10/2003 | Ma | F16K 11/076 137/625.47 |
| 2008/0029168 A1 | | 2/2008 | Kinlaw | |

FOREIGN PATENT DOCUMENTS

WO    2012085428    6/2012

OTHER PUBLICATIONS

International Search Report dated Jun. 8, 2013 for Application No. PCT/FR2013/051047.

* cited by examiner

*Primary Examiner* — Michael R Reid
(74) *Attorney, Agent, or Firm* — Patterson & Sheridan, LLP

(57) ABSTRACT

A directional control valve for fluid comprising an axial chamber connected to first and second radial inlet/outlet ports and to a radial outlet port for administering said solution, a rotary crank pin housed in said chamber and through which there pass connecting ducts which are connected to axial third and fourth inlet/outlet ports intended to be connected to said second reservoir, said connecting ducts being designed to connect said first, second, third, fourth inlet/outlet ports and said administering port selectively and fluidically according to the angular position of said crank pin with respect to said body.

10 Claims, 5 Drawing Sheets

DIRECTIONAL CONTROL VALVE FOR FLUID AND DEVICE FOR IN-SITU RECONSTITUTION AND ADMINISTERING

TECHNICAL FIELD

The invention relates to a directional control valve for fluid that is adapted to make up a solution in situ by mixing two ingredients coming from a first reservoir and from a second reservoir, the valve comprising: a body defining an axial chamber and being provided with radial first and second inlet/outlet (I/O) ports designed to be connected to the first reservoir and to a feed pump, and with a radial administering port adapted to enable the solution to exit, the first and second I/O ports and the administering port communicating with the chamber; and a rotary spool received in the chamber and through which link channels pass, the spool being provided with axial third and fourth I/O ports designed to be connected to the second reservoir and communicating with the link channels, the link channels being arranged to interconnect the first, second, third, and fourth I/O ports and the administering port selectively and for fluid flow, depending on the angular position of the spool relative to the body so that, in a first angular position, they connect the first I/O port to the third I/O port, and close off the second I/O port and the fourth I/O port so that, by means of the feed pump, they enable the ingredient to be transferred between the first reservoir and the second reservoir.

The invention also relates to in-situ making-up and administering apparatus for making up in situ and for administering a solution obtained by mixing two ingredients coming from first and second reservoirs, the in-situ making-up and administering apparatus including a directional control valve for fluid, the valve comprising a body and a spool mounted to move in rotation in said body, motor-drive means for driving the spool, and a fluid-flow circuit element arranged to interconnect the first and second I/O ports.

PRIOR ART

It is frequently necessary to mix ingredients so as to make up and homogenize a solution immediately before it is used. This applies, in particular to solutions for therapeutic purposes, in the medical or veterinary fields, or for other purposes, e.g. in the cosmetics field. Mixing or making up solutions immediately before they are used is very useful when the solution is unstable once it has been mixed or made up. This applies particularly for new therapeutic molecules of biological origin which can be preserved mainly only in the form of solid powder to be put in suspension, or in lyophilized (freeze-dried) form, or to be made up immediately before administering. To make up such a solution, for example, a first ingredient in the form of a solid powder, or in a lyophilized, dehydrated, or concentrated form, is used with a second ingredient of the solvent type. In order to obtain a homogeneous solution, the making-up requires a specific protocol to be followed. Once obtained, the solution can be administered by any suitable means. The term "administering" is used, in particular, to cover any act making it possible to have an ingredient absorbed by a user, be it by injection, perfusion, oral route, cutaneous route, or by any other suitable means.

Four to ten manual steps can be necessary to make up a solution, requiring the use of one or more syringes, bottles, needles and the like for successively:

taking a first ingredient from a first bottle by using a first syringe;

transferring the taken ingredient to a second bottle containing a second ingredient, by using the first syringe, while avoiding emulsion or clumping effects during the transfer;

blending the first and second ingredients in order to obtain a homogeneous solution of the mixture of the first and second ingredients;

taking the solution by using the same syringe or by using a second syringe; and administering the solution by using the same syringe as used during the taking, but generally equipped with a new needle that is specifically adapted to injection.

In order to guarantee satisfactory hygiene conditions, the syringes and bottles need to be sterile, which is a considerable constraint. In addition, a predetermined waiting time must be left between the making-up steps. Furthermore, repeated use of syringes having needles increases the risks of injury to the personnel doing the making-up. Finally, making up certain solutions involves cytotoxic substances, use of which requires air extraction installations and atmosphere monitoring installations. Such installations represent a non-negligible additional cost and can be used only in specific dedicated locations, which does not make it possible for them to be used in the majority of situations of use. Thus, making up solutions and administering them must be performed by medical personnel.

Thus, it is necessary to propose making-up apparatus of the "closed" type, enabling making-up to take place without any risk of contamination from liquid, powder, or vapor, and making it possible to guarantee a good level of asepsis. There is thus a genuine need for making-up apparatus that is simple and reliable to use, and that can be operated by people without any medical training, and that optionally makes it possible to administer the resulting made-up solutions.

In order to make up a solution from two ingredients, it is possible to use directional control valves of the 6/3 type, namely of the type having six ports and three positions, such as the directional control valve described in Publication WO 2012/085 428. Unfortunately, the construction of such directional control valves makes them complicated to manufacture.

SUMMARY OF THE INVENTION

An object of the invention is to mitigate the drawbacks of existing directional control valves for fluid by proposing a valve that is of simple construction, that makes it possible to make up a homogeneous solution comprising a mixture of two ingredients, and that is easy to use by a user who does not have any medical training, the valve optionally being incorporated in apparatus for mixing a solution and for administering the resulting solution, e.g. by injection.

To this end, the invention provides a directional control valve for fluid that is adapted to make up a solution in situ by mixing two ingredients coming from a first reservoir and from a second reservoir, the valve comprising: a body defining an axial chamber and being provided with radial first and second inlet/outlet (I/O) ports designed to be connected to the first reservoir and to a feed pump, and with a radial administering port adapted to enable the solution to exit, the first and second I/O ports and the administering port communicating with the chamber; and a rotary spool received in the chamber and through which link channels pass, the spool being provided with axial third and fourth I/O ports designed to be connected to the second reservoir and communicating with the link channels, the link channels being arranged to interconnect the first, second, third, and fourth I/O ports and the administering port selectively and for fluid flow, depending on the angular position of the spool relative to the body so that, in a first angular position, they connect the first I/O port to the third I/O port, and close off the second I/O port and the fourth I/O port so that, by means of the feed pump, they enable the ingredient to be transferred between the first reservoir and the second reservoir, said valve being characterized in that the link channels are arranged so that:

in a second angular position, said link channels connect the first I/O port to the third I/O port and connect the second I/O port to the fourth I/O port so that, by means of the feed pump, they enable the mixture to be transferred and blended between the first and second reservoirs; and in a third angular position, said link channels connect the first I/O port to the administering port, and close off the second I/O port, the third I/O port, and the fourth I/O port so that, by means of the feed pump they enable the resulting solution to be administered.

In the present specification, the terms "first", "second", and "third" are used in non-limiting manner to distinguish between similar elements.

The basic idea lying behind the invention is to provide a particular configuration for the link channels that makes it possible to obtain a directional control valve of the 5/3 type, namely having five ports and three positions, that is of simple design and that is simple to use.

In a first embodiment of the valve of the invention, the link channels comprise the following three link channels:

a first link channel in the shape of an upside-down T having its central branch provided with the third I/O port, having a first radial branch provided with a first radial opening, and having a second radial branch provided with a second radial opening, the first link channel being arranged so that:
  in the first angular position, the first radial opening is situated in register with the first I/O port and the second radial opening is closed off by the wall of the chamber;
  in the second angular position, the second radial opening is situated in register with the first I/O port and the first radial opening is closed off by the wall of the chamber; and
  in the third angular position, the first and second radial openings are closed off by the wall of said chamber;

a second link channel in the shape of an upside-down L having its long bar provided with the fourth I/O port and having its short bar provided with a radial opening, the second link channel being arranged so that:
  in the first and third angular positions, the first radial opening is closed off by the wall of the chamber; and
  in the second angular position, the radial opening is situated in register with the second I/O port;

a third link channel passing radially through the spool and provided with a first radial opening and with a second radial opening, the third link channel being arranged so that:
  in the first and second angular positions, the first and second radial openings are closed off by the wall of said chamber; and
  in the third angular position, the first radial opening is situated in register with the first I/O port and the second radial opening is situated in register with the administering port.

The first embodiment of the valve of the invention may have the following features:
  the axes of the first and second radial openings of the first link channel, of the first radial opening of the third link channel and the first I/O port lie in a first radial plane;
  the axes of the radial opening of the second link channel and the second I/O port lie in a second radial plane distinct from the first radial plane; and
  the axis of the second radial opening of the third link channel and the administering port lie in a third radial plane distinct from the first and second radial planes.

The first embodiment of the valve of the invention may have the following features:
  the first I/O port, the second I/O port, and the administering port are situated in the same midplane of the body, and the first and second link channels are situated in the same first axial plane of the spool; and
  the third link channel is situated in a second axial plane of the spool that is offset angularly by 90° relative to the first axial plane;
  so that going between the first and second angular positions is obtained by turning the spool through a half-turn in the body and so that, going between the first and third positions and going between the second and third positions is obtained by turning the spool through respective quarter-turns in the body.

In second and third embodiments of the valve of the invention, the link channels comprise the following two link channels:

a first link channel in the shape of an upside-down L that is provided with a plurality of short bars, that has its long bar provided with the fourth I/O port, that has a first one of its short bars provided with a first radial opening, that has a second one of its short bars provided with a second radial opening, and that has a third one of its short bars provided with a third radial opening, the first link channel being arranged so that:
  in the third angular position, the first, second, and third radial openings are closed off by the wall of said chamber;
  in the second angular position, the second radial opening is situated in register with the first I/O port and the first and third radial openings are closed off by the wall of the chamber; and
  in the third angular position, the third radial opening is situated in register with the first I/O port, the first radial opening is situated in register with the administering port, and the second radial opening is closed off by the wall of the chamber;

a second link channel in the shape of an upside-down T that is provided with a plurality of radial branches, that has its central branch provided with the third I/O port, that has a first one of its radial branches provided with a first radial opening, that has a second one of its radial branches provided with a second radial opening, and that has a third one of its radial branches provided with a third radial opening, the second link channel being arranged so that:
  in the first angular position, the first radial opening is situated in register with the second I/O port and the second and third radial openings are closed off by the wall of the chamber; and
  in the second angular position, the second radial opening is situated in register with the second I/O port and the first and third radial openings are closed off by the wall of the chamber; and in the third angular position, the third radial opening is situated in register with the second I/O port and the second and third radial openings are closed off by the wall of the chamber.

In the second embodiment, the directional control valve for fluid may have all of the following features:

the axes of the second and third radial openings of the first link channel and the first I/O port lie in a first radial plane;

the axes of the first, second and third radial openings of the second link channel, and the second I/O port lie in a second radial plane; and the axis of the first radial opening of the first link channel and the administering port lie in a third radial plane distinct from the first and second radial planes.

In the second embodiment, the directional control valve for fluid may have the following features:

the first and second I/O ports and the administering port are substantially situated in the same midplane of the body, and the first link channel is situated in a first axial plane of the spool so that going between the first and second angular positions is obtained by turning the spool through a half-turn in the body; and the first and third radial openings of the second link channel are situated in a second axial plane of the spool and the second radial opening is situated in a third axial plane of the spool that is angularly offset by about 90° relative to the second axial plane so that going between the first and third positions and going between the second and third positions is obtained by turning the spool through respective quarter-turns in the body.

In the third embodiment, the directional control valve for fluid may have all of the following features:

the axes of the first and third radial openings of the first link channel and the first I/O port lie in a first radial plane;

the axes of the first, second and third radial openings of the second link channel, and the second I/O port lie in a second radial plane; and the axis of the second radial opening of the first link channel and the administering port lie in a third radial plane distinct from the first and second radial planes.

In advantageous manner, the directional control valve further comprises an annular seal provided between the spool and the body, the annular seal having a solid portion through which orifices pass that are designed to be in register with the first radial opening, the second radial opening, and the third radial opening of said first link channel, with the first radial opening, the second radial opening, and the third radial opening of the second link channel, and with the first radial opening and the second radial opening of the third link channel, the solid portion being arranged to provide selective sealing between the link channels.

The invention also provides in-situ making-up and administering apparatus for making up in situ and for administering a solution obtained by mixing two ingredients coming from first and second reservoirs, the in-situ making-up and administering apparatus including a directional control valve for fluid, the valve comprising a body and a spool mounted to move in rotation in the body, motor-drive means for driving the spool, and a fluid-flow circuit element arranged to interconnect the first and second I/O ports, said apparatus being characterized in that it includes a directional control valve for fluid as defined above, motor-drive means for driving the spool, a fluid-flow circuit element arranged to interconnect said first and second I/O ports and the first reservoir, and a feed pump connected to the fluid-flow circuit element.

BRIEF DESCRIPTION OF THE DRAWINGS

The present invention can be better understood and other advantages appear on reading the following detailed description of embodiments given by way of non-limiting example and with reference to the accompanying drawings, in which.

DESCRIPTION OF EMBODIMENTS

The directional control valve for fluid and the in situ making-up and administering apparatus of the invention may be used for mixing a liquid first ingredient with a second ingredient of any type (concentrate, lyophilisate, powder, etc.). The solution as made up in situ may be administered by any suitable technique. In non-limiting manner, the following description relates to a valve that can be incorporated in apparatus for mixing pharmaceutical ingredients and for administering the resulting made-up solution by injection.

Figure 8:
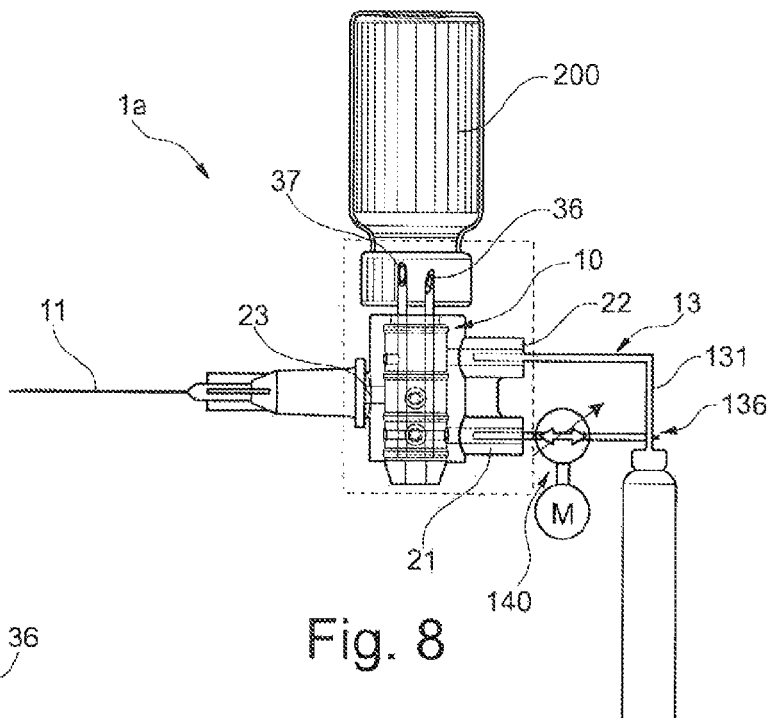
FIGS. 8 and 9 are section views of respective ones of two embodiments of in situ making-up and administering apparatus provided with the first embodiment of the valve of the invention.
Figure 9:
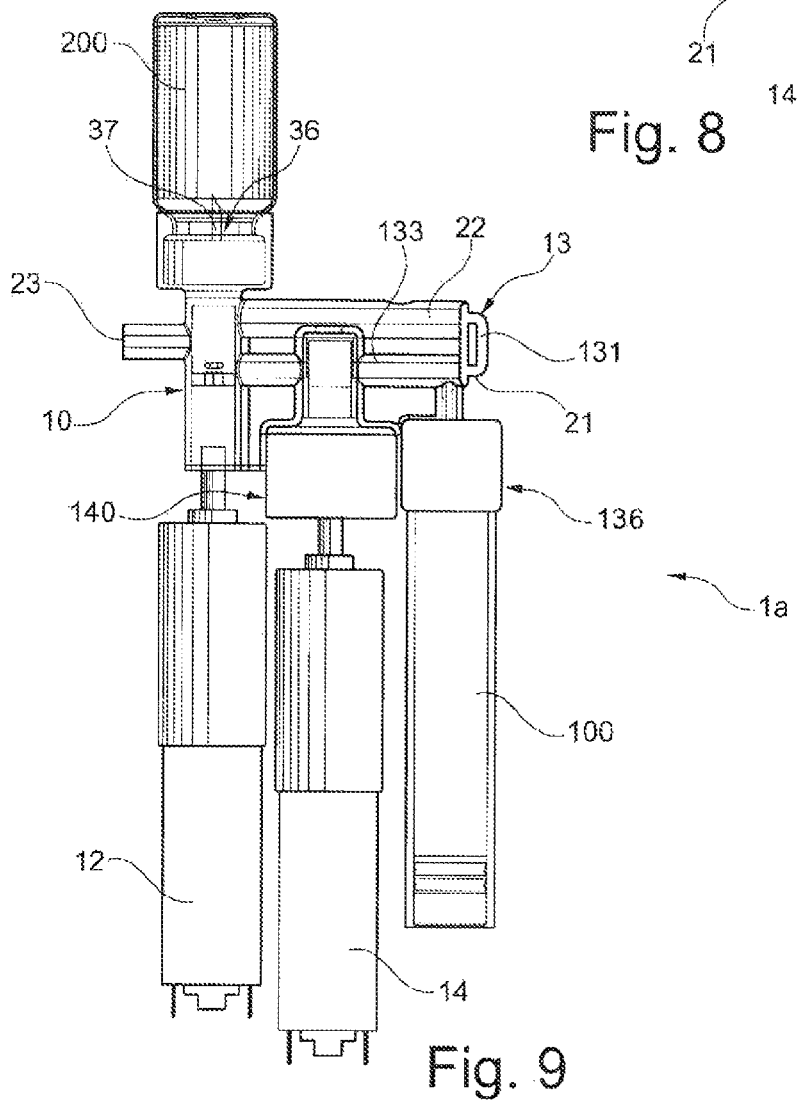
Figure 10:
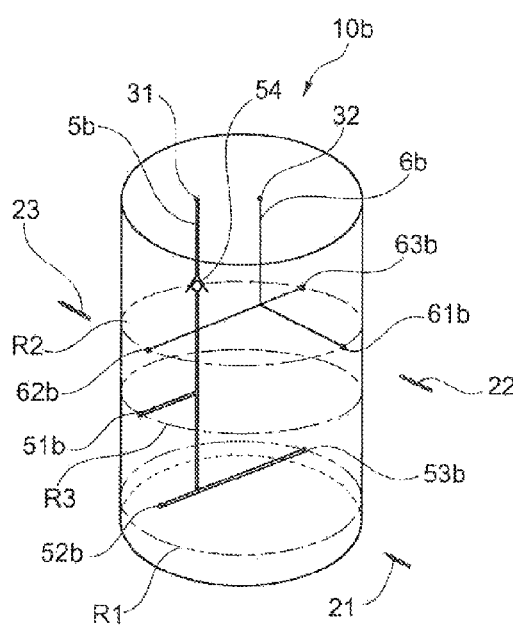
FIG. 10 is a diagrammatic view of a second embodiment of the valve of the invention.

With reference to FIGS. 8 and 9, the mixing and administering apparatus 1*a* includes a directional control valve 10*a*, an injection needle 11 (shown in FIG. 8 only), motor-drive means 12, a fluid-flow circuit element 13, and a feed pump 14.

With reference, in particular, to FIGS. 1 to 7, a first embodiment of the directional control valve 10*a* of the invention comprises a body 2, a spool 3*a*, and an annular seal 4 provided between the body 2 and the spool 3*a*.

The body 2 is tubular in overall shape and defines a cylindrical chamber 20 opening out axially on either side of the body 2. The body 2 is provided with radial first and second inlet/outlet (I/O) ports 21, 22 and with a radial administering port 23, these ports extending radially from the chamber 20 and being disposed in the same midplane P1 of the body 2. The first and second I/O ports 21, 22 are diametrically opposite from the administering port 23. The axis of the first I/O port 21 is situated in a first radial plane R1, the axis of the second I/O port 22 is situated in a second radial plane R2 that is distinct from the first radial plan R1, and the axis of the administering port 23 is situated in a third radial plane R3 provided between the first and second radial planes R1, R2. The body 2 is provided with an angular and axial abutment 24 that has a function that is specified below. In addition, the chamber 20 is provided with an internal shoulder 25 that has a function that is also specified below. The first and second I/O ports 21, 22 are designed to be connected to the feed pump 14 and to a first reservoir 100 via the fluid-flow circuit element 13. In this embodiment, the feed pump 14 is provided between the first reservoir 100 and the first I/O port 21. The administering port 23 is adapted to allow the made-up solution to exit and is suitable, for example, for receiving an injection needle 11 in interfitting manner for administering the solution by injection.

The spool 3a is cylindrical in overall shape and carries the annular seal 4 that is tubular in overall shape. For example, the annular seal 4 may be made of elastomer. In the example shown, the annular seal 4 is secured to the spool 3a over which it may be overmolded. The outside diameter of the annular seal 4 is substantially similar to the inside diameter of the chamber 20. Thus, the spool 3a carrying the annular seal 4 can be received in the chamber 20, the annular seal 4 providing the sealing between the spool 3a and the body 2. The spool 3a is provided with axial third and fourth I/O ports 31, 32 provided at the same axial end of the spool 3a, each port being provided with a respective transfer needle 36, 37. In the example shown, each of the third and fourth I/O ports 31, 32 is provided with a respective transfer needle 36, 37 designed to perforate the stopper of a second reservoir 200, e.g. a reservoir of the bottle type. The transfer needles 36, 37 of the third and fourth I/O ports 31, 32 are preferably of different lengths in order to facilitate the blending. The spool 3a is provided with link channels 5a, 6a, 7a that pass through it and that are connected to the third and fourth I/O ports 31, 32. The link channels 5a, 6a, 7a comprise a first link channel 5a, a second link channel 6a, and a third link channel 7a that are independent from one another. For example, these link channels 5a, 6a, 7a may be of substantially circular cross-section.

Figure 1:
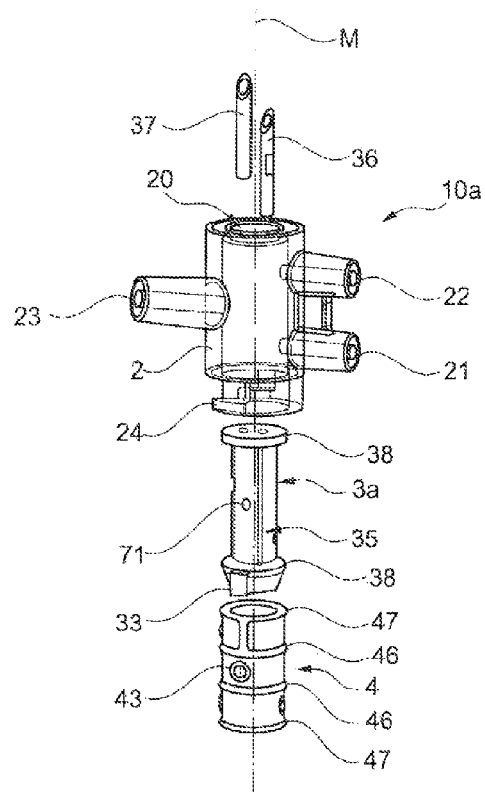
FIG. 1 is an exploded perspective view of a first embodiment of the directional control valve for fluid of the invention.
Figures 2, 3:
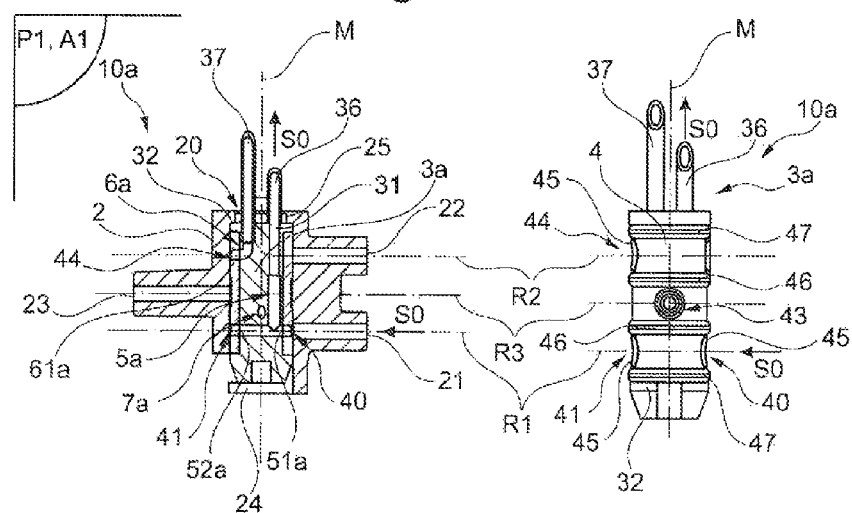
FIGS. 2 and 3 are respectively a section view and a front view of the FIG. 1 valve of in a "transfer" first position.
Figure 4:
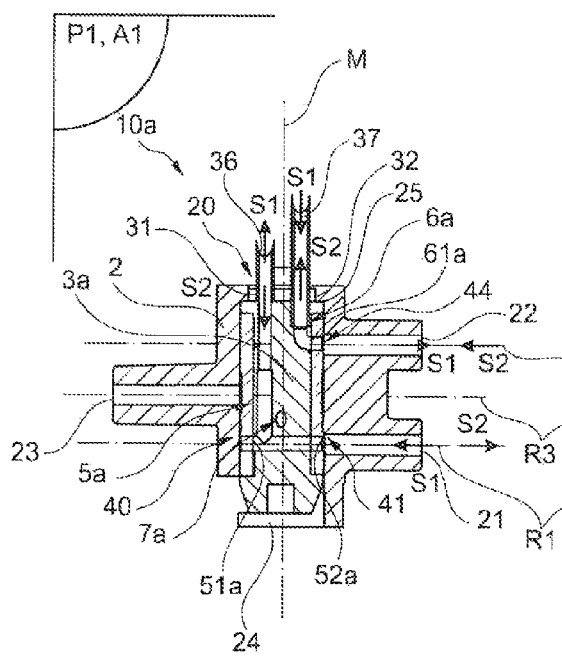
FIGS. 4 and 5 are views similar to FIGS. 2 and 3 and showing a "making-up" second position of the FIG. 1 valve.

With reference, in particular, to FIGS. 2 and 4, the first link channel 5a is in the shape of an upside down T having the end of its central trunk opening out axially at an axial third I/O port 31 and having its branches passing radially through the spool 3a and opening out at a first radial opening 51a and at a second radial opening 52a provided at the first radial plane R1 containing the first I/O port 21.

With reference, in particular, to FIGS. 2 and 4, the second link channel 6a is in the shape of an upside-down L having its long bar opening out axially at a fourth I/O port 32 and having its short bar opening out radially at a first radial opening 61a having its axis substantially coinciding with the second radial plane R2 containing the second I/O port 22.

The first and second link channels 5a, 6a are situated in the same first axial plane A1 of the spool 3a. The central trunk of the first link channel 5a and the second link channel 6a are disposed on either side of the axis M of the spool 3a.

Figure 6:
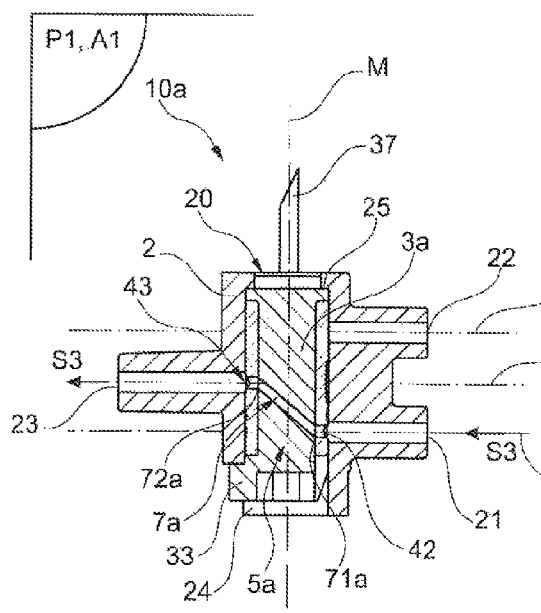
FIGS. 6 and 7 are views similar to FIGS. 2 and 3 and showing an "administering" third position of the FIG. 1 valve, in which position administering is performed from the first reservoir.

With reference, in particular, to FIG. 6, the third link channel 7a is inclined and passes laterally through the spool 3a while opening out at a first radial opening 71a having its axis substantially coinciding with the first radial plane 71 containing the axis of the first I/O port 21 and at a second radial end 72a having its axis substantially coinciding with the third radial plane R3 containing the axis of the administering port 23, the first and second radial openings 71a, 72a being diametrically opposite. The axis of the third link channel 7a is situated in a second axial plane A2 of the spool 3a. In the example shown, the second axial plane A2 of the spool 3a is offset from the first axial plane A1 of the spool 3a by an angle of about 90°. The third link channel 7a passes across the axis M of the spool 3a above the branches of the first link channel 5a. In addition to this particular positioning of the third link channel 7a relative to the first and second link channels 5a, 6a, the dimensions of the link channels 5a, 6a, 7a are designed so that there is no interference between the first or second link channels 5a, 6a and the third link channel 7a.

In a variant embodiment (not shown), the third link channel may be designed so that its first end opens out in a third radial plane that coincides with the second radial plane containing the second I/O port.

In register with the first and second radial openings 51a, 52a, 71a, 72a of the first and third link channels 5a, 7a, and in register with the first radial opening 61a of the second link channel 6, the annular seal 4 is provided with through transfer orifices 40-44 allowing fluid to pass through them. The transfer orifices 40-44 thus include first and second transfer orifices 40, 41 that are diametrically opposite and that have their axes designed to be in the first radial plane R1 and in register with respective ones of the axes of the first and second radial openings 51a, 52a of the first link channel 5a. The first and second transfer orifices 40, 41 are thus designed with their axes in the first axial plane A1. The transfer orifices 40-44 also include a third transfer orifice 42 provided between the first and second transfer orifices 40, 41 with an axis in the first radial plane R1, in the second axial plane A2 and in register with the first radial opening 71a of the third link channel 7a. In addition, the link channels 40-44 include a fourth transfer orifice 43 having its axis designed to be in the second radial plane R2 and in the second axial plane A2, in register with the second radial opening 72a of the third link channel 7a. Finally, the link channels 40-44 include a fifth transfer orifice 44 having its axis designed to be in the second radial plane R2 and in the first axial plane A1, in register with the first radial opening 61a of the second link channel 6a. Each transfer orifice 40-44 is surrounded by an annular lip 45 that reinforces the sealing between the annular seal 4 and the body 2. In addition, around its periphery, the annular seal 4 is provided with intermediate annular lips 46 making it possible to isolate the first, second, and third radial planes R1, R2, R3 from one another. The annular seal 4 is also provided with two end annular lips 47 provided respectively beyond the first radial plane R1 and beyond the second radial plane R2 relative to the third radial plane R3 and making it possible to isolate the first and second radial planes R1, R2 from the outside. The intermediate annular lips 46 may be interconnected or be connected to the end annular lips 47 via crosspieces 48 (visible in FIG. 7) preventing any annular flow of fluid, reinforcing the sealing of the valve 10a and making it possible to reduce the dead volume.

The spool 3a is blocked axially in the chamber 20 by the internal shoulder 25 in a first axial direction and by the angular and axial abutment 24 in a second axial direction. The spool 3a has an external lateral rib 35 (visible in FIG. 1) designed to co-operate with the annular seal 4 to reinforce preventing the annular seal 4 from moving in rotation relative to the spool 3a. The spool 3a is also provided with two shoulders 38 of diameter greater than the inside diameter of the annular seal 4 so as to block the annular seal 4 axially relative to the spool 3a.

The spool 3a is provided with a radial lug 33 designed to co-operate with the angular and axial abutment 24 of the body 2 to limit the rotation of the spool 3a relative to the body 2.

The spool 3a is coupled to motor-drive means 12 of standard type adapted to cause the spool 3a and the annular seal 4 to pivot angularly relative to the body 2 into predetermined angular positions. The mechanical coupling between the spool 3a and the motor-drive means 12 is of known type and is designed to make coupling and decoupling easy.

The fluid-flow circuit element 13 makes it possible to interconnect the first and second I/O ports 21, 22.

With reference, in particular, to FIG. 9, the fluid-flow circuit element 13 may include a fluid-flow duct 131 having its ends connected to the first and second I/O ports 21, 22, which duct is provided with first connection means 136 enabling it to be connected to the first reservoir 100, and with second connection means 140 enabling it to be connected to a feed pump 14 disposed between the first reservoir 100 and the first I/O port 21. In a variant embodiment (not shown), the feed pump is disposed between the first reservoir and the second I/O port.

With reference to FIG. 9, the body 2 may be extended laterally so that the first I/O port 21 is separated from the chamber 20 by a tube portion 133 provided with second connection means 140 enabling it to be connected to a feed pump 14 and with first connection means 136 provided at the first I/O port 21 and enabling it to be connected to the first reservoir 100. In addition, the fluid-flow circuit element 13 includes a fluid-flow duct 131 having its ends connected to the first and second I/O ports 21, 22.

The feed pump 14 is of any type adapted to cause the contained fluid to flow between the first reservoir 100 and the second reservoir 200 and then from the first or second reservoir 100, 200 to the administering port 23.

In order to be used, the mixing and administering apparatus 1a is provided with a first reservoir 100 containing a liquid first ingredient and with a second reservoir 200 containing a second ingredient, e.g. in powder form. The first reservoir 100 is connected to the valve 10 between the first and second I/O ports 21, 22. The second reservoir 200 is connected to the valve 10a between the third and fourth I/O ports 31, 32.

In order to perform the making-up and the administering by means of the valve 10a, the procedure is as described below.

With reference to FIGS. 2 and 3, the spool 3a is placed in a "transfer" first angular position relative to the body 2, in which position the first axial plane A1 of the spool 3a and the first midplane P1 of the body 2 substantially coincide. Thus, the first radial opening 51a of the first link channel 5a is in register with the first I/O port 21, the second radial opening 52a of the first link channel 5a being closed off by the wall of the chamber 20. The feed pump 14 is caused to transfer liquid from the first reservoir 100 to the second reservoir 200 containing the second ingredient as indicated by arrows S0. The liquid contained in the first reservoir 100 passes through the first I/O port 21, through the first transfer orifice 40 of the annular seal 4, and through the first radial opening 51a of the first link channel 5a, and flows through the first link channel 5a and then through the axial opening of the first link channel 5a and through the third I/O port 31 and into the second reservoir 200. In this first angular position, the first radial opening 61a of the second link channel 6a and the administering port 23 are closed off by the wall of the chamber 20.

Figure 5:
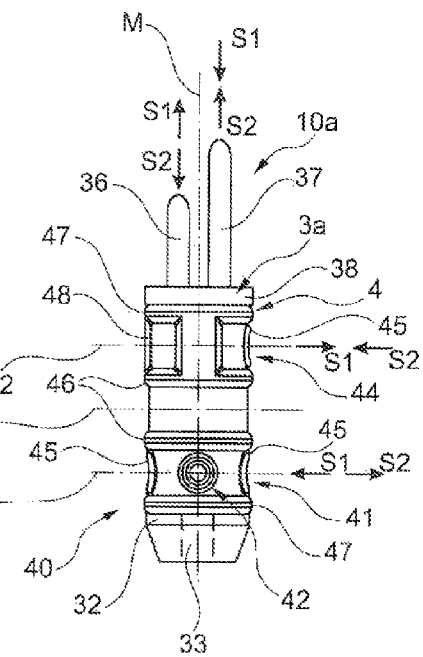

With reference to FIGS. 4 and 5, once the liquid has been transferred to the second reservoir 200, the made-up solution is blended so as to obtain a homogeneous mixture. This blending is performed by causing the mixture to flow from the second reservoir 200 and back to the second reservoir 200. For this purpose, the spool 3a is pivoted through 180°, so as to place the spool 3a in a second angular position relative to the body 2. This second position is referred to as the "making-up" position. The second angular position is defined by the radial lug 33 of the spool 3a in contact with the angular and axial abutment 24 of the body 2. In this second angular position, the first axial plane A1 of the spool 3a and the midplane P1 of the body 2 substantially coincide but in a configuration that is axially symmetrical relative to the preceding configuration. Thus, in this second angular position, the second radial opening 52a of the first link channel 5a is in register with the first I/O port 21, the first radial opening 51a of the first link channel 5a being closed off by the wall of the chamber 20. In addition, the first radial opening 61a of the second link channel 6a is in register with the second I/O port 22. In this second angular position, the administering port 23 is closed off by the wall of the chamber 20. The feed pump 14 is caused to transfer the liquid between the third and fourth I/O ports 31, 32 of the spool 3a. This flow of fluid may be caused in a first flow direction, indicated by arrows S1, firstly going through the fourth I/O port 32, and then through the second link channel 6a, through the first radial opening 61a of the second link channel 6a, through the fifth transfer orifice 44 of the annular seal 4, through the second I/O port 22, through the fluid-flow circuit element 13, through the first I/O port 21, through the second transfer orifice 41 of the annular seal 4, through the second radial opening 52a of the first link channel 5a, through the first link channel 5a, and then through the third I/O port 31. The flow of fluid may also be caused in a second flow direction, indicated by arrows S2, firstly going through the third I/O port 31, and then through the first link channel 5a, through the second radial opening 52a, through the second transfer orifice 41 of the annular seal 4, through the first I/O port 21, through the fluid-flow circuit element 13, through the second I/O port 22, through the fifth orifice 44 of the annular seal 4, through the first radial opening 61a of the second link channel 6a, through the second link channel 6a, and then through the fourth I/O port 32. This flow of fluid makes it possible to blend the mixture of the first and second ingredients and to obtain a homogeneous solution.

Once the homogeneous solution is obtained, in-situ in the reservoir 200, the spool 3a is pivoted into the "transfer" first angular position of FIGS. 2 and 3, by pivoting, in the example shown, through 180° anticlockwise as seen from above. The feed pump 14 is caused to transfer the solution contained in the second reservoir 200 to the first reservoir 100 in the direction opposite to the direction indicated by arrows S0 in FIGS. 2 and 3.

Figure 7:
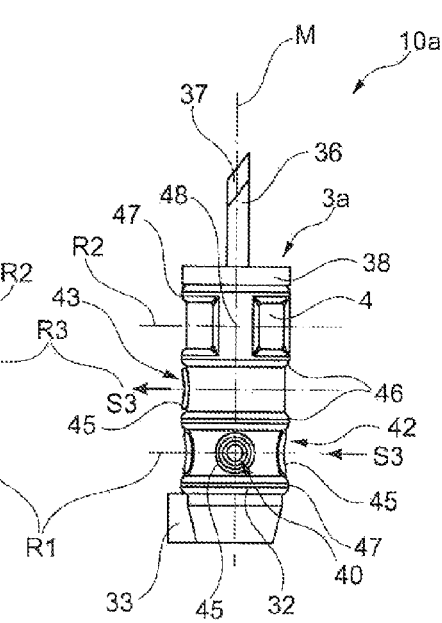

With reference to FIGS. 6 and 7, once the solution is contained in the first reservoir 100, the solution can be administered. For this purpose, the spool 3a is pivoted through 90° (through 90° clockwise in the example shown) so as to place the spool 3a in a third angular position relative to the body 2. This "administering" third angular position is angularly intermediate between the first and second angular positions. In this third position, the second axial plane A2 of the spool 3a and the midplane P1 of the body 2 substantially coincide. In the embodiment shown, in this third angular position, the first radial opening 71a of the third link channel 7a is in register with the first I/O port 21, the second radial opening 72a of the third link channel 7a is in register with the administering port 23, and the second radial opening 52a of the first link channel 5a and the radial opening 61a of the second link channel 6a are closed off by the wall of the chamber 20. Thus, the first I/O port 21 is connected to the administering port 23. The feed pump 14 is caused to transfer the liquid from the first reservoir 100 to the administering port 23 as indicated by arrows S3, via the first I/O port 21, so that the solution can be injected by the injection needle 11. Thus, the solution passes through the first I/O port 21, through the third transfer orifice 42 of the annular seal 4, through the third link channel 7a, through the fourth transfer orifice 43 of the annular seal 4, and then through the administering port 23.

In another embodiment (not shown), the spool and the seal are formed integrally in one piece. In yet another embodiment (not shown), the seal is stationary relative to the body.

FIGS. 10 to 13 show a second embodiment of the directional control valve 10b of the invention having a body 2 similar to the body in the preceding embodiment and a spool 3b as described below.

The spool 3b is provided with third and fourth I/O ports 31, 32 similar to those of the preceding spool 3a from which it differs by its link channels 5b, 6b comprising a first link channel 5b and a second link channel 6b that are independent from each other. To facilitate understanding of FIGS. 10 to 13, the first link channel 5b is shown in double lines, and the second link channel 6b is shown as a single line.

The first link channel 5b is in the shape of an upside-down L provided with a plurality of short bars that are offset angularly and axially from one another. The central trunk of the first link channel 5b opens out axially at a third I/O port 31. A first short bar of the first link channel 5b opens out radially at a first radial opening 51b, a second bar of the first link channel 5b opens out radially at a second radial opening 52b and a third bar of the first link channel 5b opens out radially at a third radial opening 53b. The first link channel 5b is situated in the same first axial plane A1 of the spool 3b. The second radial opening 52b and the third radial opening 53b are distributed on either side of the central trunk, their axes lying in a first radial plane R1 of the spool 3b that contains the axis of the first I/O port 21. The axis of the first radial opening 51b lies in a third radial plane R3 of the spool 3b that is provided between the first radial plane R1 and the third I/O port 31 and that contains the axis of the administering port 23. The first link channel 5b is also provided with a first check valve 54 provided between the junction at which the central trunk meets the first radial opening 51b and the third I/O port 31 so as to prevent any flow of fluid from one of the short bars to the third I/O port 31.

The second link channel 6b is in the shape of a T provided with a plurality of radial branches and having the end of its central trunk opening out axially at an axial fourth I/O port 32. A first radial branch opens out at a first radial opening 61b, a second radial branch opens out at a second radial opening 62b, and a third radial branch opens out at a third radial opening 63b. The axes of the first, second, and third radial openings 61b, 62b, 63b lie in a second radial plane R2 provided beyond the third radial plane R3 relative to the first radial plane R1 and containing the axis of the second I/O port 22. In addition, the axes of the second and third radial openings 62b, 63b are diametrically opposite, distributed on either side of the central trunk and lying in the first axial plane A1, and the axis of the first radial opening 61b lies in a second axial plane A2. In the example shown, the second axial plane A2 is offset by 90° relative to the first axial plane A1 so that going between the first and second positions, and going between the second and third positions, are obtained by turning the spool through respective quarter-turns inside the body.

With reference to FIGS. 11 to 14, the mixing and administering apparatus 1b is substantially similar to the preceding apparatus. It differs in that the feed pump 14 is provided between the first reservoir 100 and the second I/O port 22. In addition, the first reservoir 100 is coupled to a second check valve 101 to prevent any flow of fluid towards the first reservoir 100.

In order to perform the making-up and the administering by means of the valve 10b, the procedure is as described below.

Figure 11:
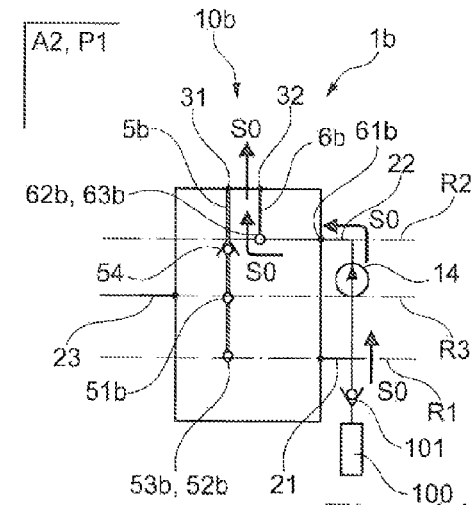
FIGS. 11 to 13 are diagrammatic views of the FIG. 10 valve respectively in first, second, and third positions, similar to the above-mentioned positions, with administration being performed from the second reservoir.

With reference to FIG. 11, the spool 3b is placed in a "transfer" first angular position relative to the body 2, in which position the second axial plane A2 of the spool 3b and the first midplane P1 of the body 2 substantially coincide. Thus, the first radial opening 61b of the second link channel 6b is in register with the second I/O port 22, the second and third radial openings 62b, 63b of the second link channel 6b being closed off by the wall of the chamber 20. The feed pump 14 is caused to transfer liquid from the first reservoir 100 to the second reservoir 200 (not shown in this figure) containing the second ingredient as indicated by arrows S0. In this first angular position, the first, second, and third radial openings 51b, 52b, 53b of the first link channel 5b and the administering port 23 are closed off by the wall of the chamber 20.

Figure 12:
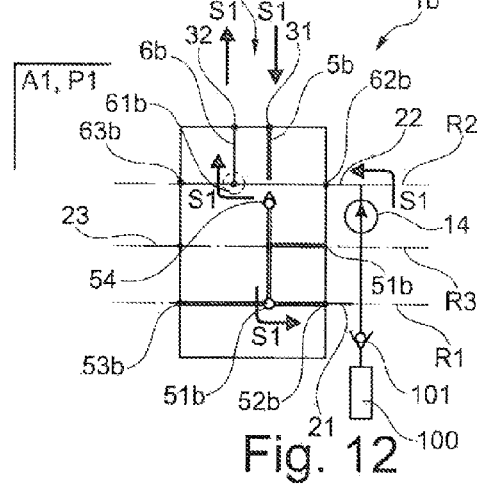

With reference to FIG. 12, once the liquid has been transferred to the second reservoir, the solution is blended. For this purpose, the spool 3b is pivoted through 90° (anticlockwise as seen from above in the example shown) so as to place the spool 3b in a "making-up" second angular position relative to the body 2. Thus, in this second angular position, the first radial plane A1 of the spool 3b and the midplane P1 of the body 2 substantially coincide, and the second opening 52b of the first link channel 5b is in register with the first I/O port 21, the first and third radial openings 51b, 53b of the first link channel 5b being closed off by the wall of the chamber 20. In addition, the second radial opening 62b of the second link channel 6b is in register with the second I/O port 22, and the first and third radial openings 61b, 63b of the second link channel 6b and the administering port 23 are closed off by the wall of the chamber 20. The feed pump 14 is caused to transfer the liquid between the fourth and third I/O ports 32, 31 of the spool 3b. This flow of fluid is caused in the first flow direction, as indicated by arrows S1. Optionally, during this transfer, the second check valve 101 prevents any return of fluid towards the first reservoir 100.

Figure 13:
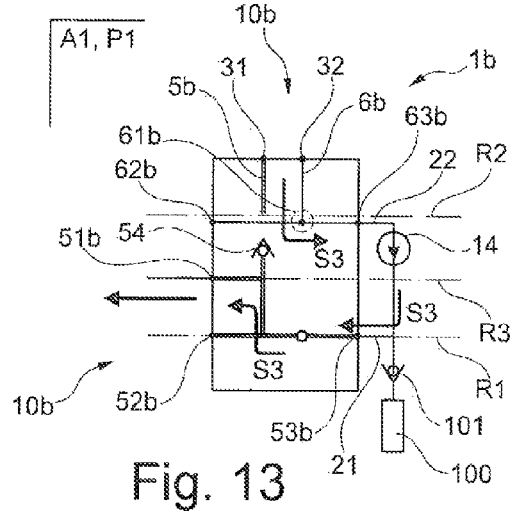
Figure 15:
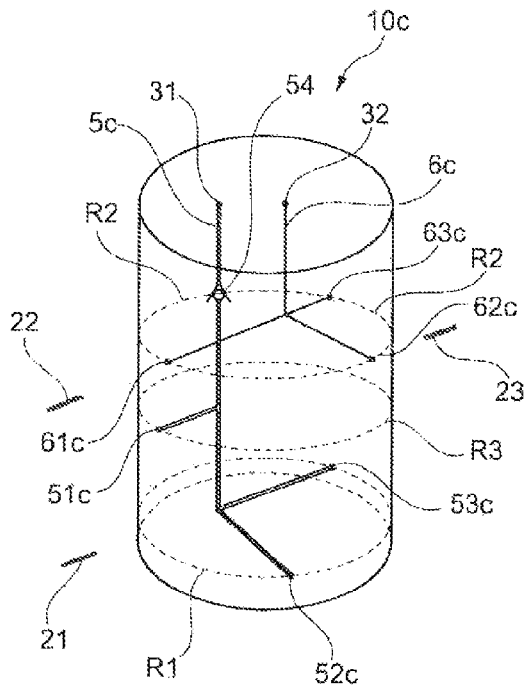
FIG. 15 is a diagrammatic view similar to FIG. 10 and showing a third embodiment of the valve of the invention.

Once the homogeneous solution has been obtained, in situ in the reservoir 200, it is possible to administer it. With reference to FIG. 13, the spool 3b is pivoted through 180° so as to place the spool 3b in an "administering" third angular position relative to the body 2. This third angular position is substantially symmetrical axially to the first angular position. In this third angular position, the first axial plane A1 of the spool 3b and the midplane P1 of the body 2 substantially coincide, and the third radial opening 53b of the first link channel 5b is in register with the first I/O port 21, the first radial opening 51b, of the first link channel 5b is in register with the administering port 23, and the second radial opening 52b of the first link channel 5b is closed off by the wall of the chamber 20. In addition, the third radial opening 63b of the second link channel 6b is in register with the second I/O port 22, and the first and second radial openings 61b, 62b of the second link channel 6b are closed off by the wall of the chamber 20. The feed pump 14 is caused to transfer the liquid from the second reservoir to the administering port 23 as indicated by arrows S3. During administering, the first check valve 54 prevents any return of fluid towards the second reservoir via the second channel 5b. Administering is thus performed from the second reservoir.

Figure 14:
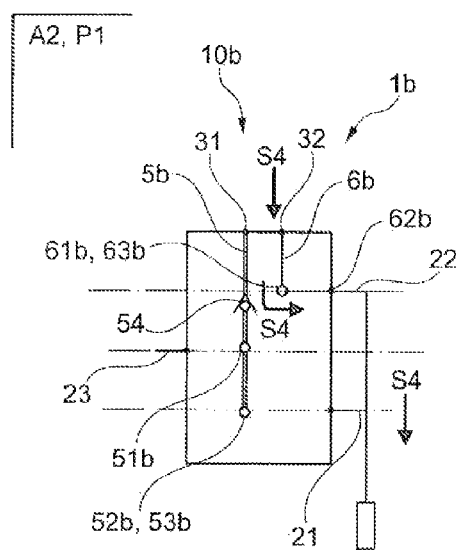
FIG. 14 is a diagrammatic view of the valve of FIGS. 11 to 13 shown in a third position equivalent to the position of FIG. 13, with administration being performed from the second reservoir.

In a variant embodiment shown in FIG. 14, in order to administer the solution from the first reservoir 100, before administering, the solution is transferred from the second reservoir to the first reservoir. For this purpose, the spool 3b is pivoted from the second position to the first angular position of FIG. 12 by pivoting the spool 3b through 90°, clockwise as seen from above in the example shown. The feed pump 14 is caused to transfer the solution contained in the second reservoir to the first reservoir 100 in the flow direction indicated by arrows S4 that point in the opposite direction to the direction indicated by arrows S0 in FIG. 12. In order to achieve such a mode of operation, the mixing and administering apparatus 1b does not have any second check valve 101. Then, in order to go from this position to the above-described third position, the spool 3b is pivoted through 90°, clockwise as seen from above in the example shown, and the solution contained in the first reservoir 100 is administered.

FIGS. 15 to 18 show a third embodiment of the directional control valve 10c of the invention having a body 2 similar to the body in the preceding embodiment and a spool 3c as described below.

The spool 3c is provided with third and fourth I/O ports 31, 32 similar to those of the preceding spools 3a, 3b from which it differs by its link channels 5c, 6c comprising a first link channel 5c and a second link channel 6c that are independent from each other. To facilitate understanding of FIGS. 15 to 18, the first link channel 5c is shown in double lines, and the second link channel 6c is shown as a single line.

The first link channel 5c is in the shape of an upside-down L provided with a plurality of short bars that are offset angularly and axially from one another. The central trunk of the first link channel 5c opens out axially at a third I/O port 31. A first short bar of the first link channel 5c opens out radially at a first radial opening 51c, a second bar of the first link channel 5c opens out radially at a second radial opening 52c and a third bar of the first link channel 5c opens out radially at a third radial opening 53c. The first link channel 5c is situated in the same first axial plane A1 of the spool 3c.

The axes of the second and third radial openings 52c, 53c lie in a first radial plane R1 of the spool 3c that contains the axis of the first I/O port 21. The axes of the second and third radial openings 52c, 53c are also angularly offset from each other; in the example shown, they are offset by 90°. The axis of the first radial opening 51c of the spool 3c lies in a third radial plane R3 of the spool 3c that contains the axis of the administering port 23, that is situated between the first radial plane R1 and the third I/O port 31. The axes of the first and third radial openings 51c, 53c lie in a first axial plane A1 of the spool 3c. The first link channel 5c is also provided with a first check valve 54 provided between the junction at which the central trunk meets the first radial opening 51c and the third I/O port 31 so as to prevent any flow of fluid from one of the short bars to the third I/O port 31.

The second link channel 6c is in the shape of a T provided with a plurality of radial branches and having the end of its central trunk opening out axially at an axial fourth I/O port 32. A first radial branch opens out at a first radial opening 61c, a second radial branch opens out at a second radial opening 62c, and a third radial branch opens out at a third radial opening 63c. The axes of the first, second, and third radial openings 61c, 62c, 63c lie in a second radial plane R2 provided beyond the third radial plane R3 relative to the first radial plane R1 and containing the axis of the second I/O port 22. In addition, the axes of the second and third radial openings 61c, 63c are diametrically opposite, distributed on either side of the central trunk and lying in the first axial plane A1, and the axis of the second radial opening 62c lies in a second axial plane A2. In the example shown, the second axial plane A2 is offset by 90° relative to the first axial plane A1 so that going between the first and second positions, and going between the second and third positions, are obtained by turning the spool through respective quarter-turns inside the body.

Figure 16:
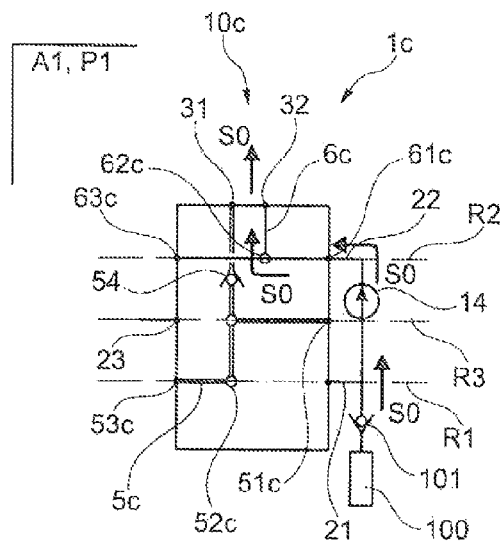
FIGS. 16 to 18 are diagrammatic views of the FIG. 15 valve that are similar to FIGS. 11 to 13.
Figure 17:
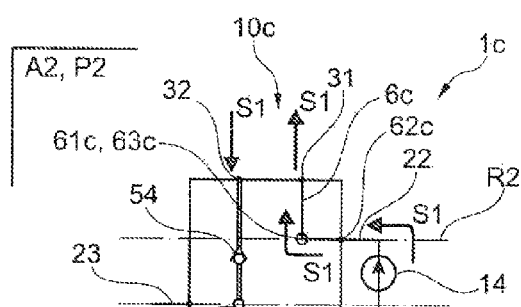
Figure 18:
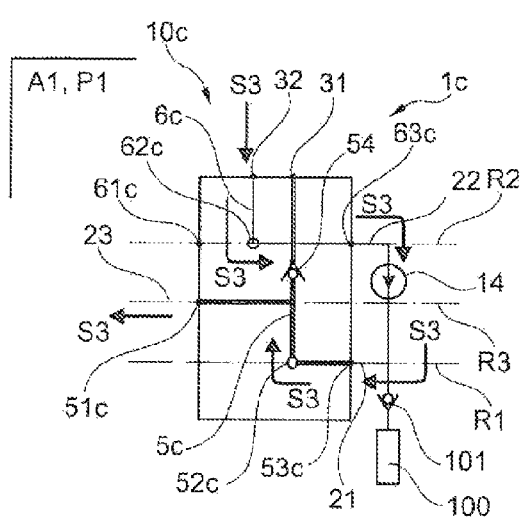

With reference to FIGS. 16 to 18, the mixing and administering apparatus 1c is substantially similar to the preceding apparatus. It differs therefrom by the configuration of the first and second link channels 5c, 6c.

In order to perform the making-up and the administering by means of the valve 10c, the procedure is as described below.

With reference to FIG. 16, the spool 3c is placed in a "transfer" first angular position relative to the body 2, in which position the second axial plane A1 of the spool 3c and the first midplane P1 of the body 2 substantially coincide. Thus, the first radial opening 61c of the second link channel 6c is in register with the second I/O port 22, the second and third radial openings 62b, 63c of the second link channel 6c being closed off by the wall of the chamber 20. The feed pump 14 is caused to transfer liquid from the first reservoir 100 to the second reservoir 200 (not shown in this figure) containing the second ingredient as indicated by arrows S0. In this first angular position, the first, second, and third radial openings 51c, 52c, 53c of the first link channel 5c and the administering port 23 are closed off by the wall of the chamber 20.

With reference to FIG. 17, once the liquid has been transferred to the second reservoir, the solution is blended. For this purpose, the spool 3c is pivoted through 90° (clockwise as seen from above in the example shown) so as to place the spool 3c in a "making-up" second angular position relative to the body 2. In this second angular position, the second radial plane A2 of the spool 3c and the midplane P1 of the body 2 substantially coincide, and the second radial opening 52c of the first link channel 5c is in register with the first I/O port 21, the first and third radial openings 51c, 53c of the first link channel 5c being closed off by the wall of the chamber 20. In addition, the second radial opening 62c of the second link channel 6c is in register with the second I/O port 22, and the first and third radial openings 61c, 63c of the second link channel 6c and the administering port 23 are closed off by the wall of the chamber 20. The feed pump 14 is caused to transfer the liquid between the third and fourth I/O ports 31, 32 of the spool 3b. This flow of fluid is caused in the first flow direction, as indicated by arrows S1. Optionally, during this transfer, the second check valve 101 prevents any return of fluid towards the first reservoir 100.

Once the homogeneous solution has been obtained, in situ in the reservoir 200, it is possible to administer it. With reference to FIG. 18, the spool 3c is pivoted through 90° (clockwise as seen from above in the example shown) so as to place the spool 3c in an "administering" third angular position relative to the body 2. This third angular position is substantially symmetrical axially to the first angular position. In this third angular position, the first axial plane A1 of the spool 3c and the midplane P1 of the body 2 substantially coincide, and the third radial opening 53c of the first link channel 5c is in register with the first I/O port 21, the first radial opening 51c, of the first link channel 5c is in register with the administering port 23, and the second radial opening 52c of the first link channel 5c is closed off by the wall of the chamber 20. In addition, the third radial opening 63c of the second link channel 6c is in register with the second I/O port 22, and the first and second radial openings 61c, 62c of the second link channel 6c are closed off by the wall of the chamber 20. The feed pump 14 is caused to transfer the liquid from the second reservoir to the administering port 23 as indicated by arrows S3. During administering, the first check valve 54 prevents any return of fluid towards the second reservoir via the second channel 5c. Administering is thus performed from the second reservoir.

As appears from the description, the mixing and administering apparatus 1a; 1b; 1c of the invention thus includes a disposable portion and a reusable portion. The motor-drive means 12 can easily be decoupled from the spool 3 so as to be used with another directional control valve 10a; 10b; 10c.

The invention makes it possible to achieve the above-mentioned objectives. The directional control valve for fluid and the mixing and administering apparatus are simple to use. The external and internal fluid paths of the directional control valve are simplified.

Naturally, the present invention is in no way limited to the above description of one of its implementations, which can undergo modifications without going beyond the ambit of the invention. For example, it is possible to increase the number of stages of the directional control valve for fluid, and to provide additional link channels, e.g. for connecting to additional reservoirs.

The invention claimed is:

1. A directional control valve for fluid that is adapted to make up a solution in situ by mixing two ingredients coming from a first reservoir and from a second reservoir, said valve comprising:
   a body defining an axial chamber and being provided with radial first and second inlet/outlet (I/O) ports designed to be connected to said first reservoir and to a feed pump, and with a radial administering port adapted to enable said solution to exit, said first and second I/O ports and said administering port communicating with said chamber; and
   a rotary spool received in said chamber and through which link channels pass, said spool being provided with axial third and fourth I/O ports designed to be connected to said second reservoir and communicating with said link channels, said link channels being arranged to interconnect said first, second, third, and fourth I/O ports and said administering port selectively and for fluid flow, depending on the angular position of the spool relative to said body so that, in a first angular position, they connect said first I/O port to said third I/O port, and close off said second I/O port and said fourth I/O port so that, by means of said feed pump (14), they enable the ingredient to be transferred between said first reservoir and said second reservoir, said valve being characterized in that said link channels are arranged so that:
   in a second angular position, said link channels connect said first I/O port to said third I/O port and connect said second I/O port to said fourth I/O port so that, by means of said feed pump, they enable the mixture to be transferred and blended between said first and second reservoirs; and
   in a third angular position, said link channels connect said first I/O port to said administering port, and close off said second I/O port, said third I/O port, and said fourth I/O port so that, by means of said feed pump they enable the resulting solution to be administered.

2. A directional control valve according to claim 1, characterized in that said link channels comprise the following three link channels:
   a first link channel in the shape of an upside-down T having its central branch provided with said third I/O port, having a first radial branch provided with a first radial opening, and having a second radial branch provided with a second radial opening, said first link channel being arranged so that:
      in said first angular position, said first radial opening is situated in register with said first I/O port and said second radial opening is closed off by a wall of said chamber;
      in said second angular position, said second radial opening is situated in register with said first I/O port and said first radial opening is closed off by the wall of said chamber; and
      in said third angular position, said first and second radial openings are closed off by the wall of said chamber;
   a second link channel in the shape of an upside-down L having its long bar provided with said fourth I/O port and having its short bar provided with a first radial opening, said second link channel being arranged so that:
      in said first and third angular positions, said first radial opening is closed off by the wall of said chamber; and
      in said second angular position, said first radial opening is situated in register with said second I/O port;
   a third link channel passing radially through said spool and provided with a first radial opening and with a second radial opening, said third link channel being arranged so that:
      in said first and second angular positions, said first and second radial openings are closed off by the wall of said chamber; and
      in said third angular position, said first radial opening is situated in register with said first I/O port and said second radial opening is situated in register with said administering port.

3. A directional control valve according to claim 2, characterized in that:
   axes of said first and second radial openings of said first link channel, of said first radial opening of said third link channel and said first I/O port lie in a first radial plane (R1);
   axes of said first radial opening of said second link channel and said second I/O port lie in a second radial plane (R2) distinct from said first radialplane (R1); and
   axis of said second radial opening of said third link channel and said administering port lie in a third radial plane distinct from said first and second radial planes (R1, R2).

4. A directional control valve according to claim 3, characterized in that:
   said first I/O port, said second I/O port, and said administering port are situated in the same midplane (P1) of said body, and said first and second link channels are situated in the same first axial plane (A1) of said spool; and said third link channel is situated in a second axial plane (A2) of said spool that is offset angularly by 90° relative to said first axial plane (A1);

so that going between said first and second angular positions is obtained by turning said spool through a half-turn in said body and so that, going between said first and third positions and going between said second and third positions is obtained by turning said spool through respective quarter-turns in said body.

5. A directional control valve according to claim 1, characterized in that said link channels comprise the following two link channels:

a first link channel in the shape of an upside-down L that is provided with a plurality of short bars, that has its long bar provided with said third I/O port, that has a first one of its short bars provided with a first radial opening, that has a second one of its short bars provided with a second radial opening, and that has a third one of its short bars provided with a third radial opening, said first link channel being arranged so that:

in said first angular position, said first, second, and third radial openings are closed off by a wall of said chamber;

in said second angular position, said second radial opening is situated in register with said first I/O port and said first and third radial openings are closed off by the wall of said chamber; and in said third angular position, said third radial opening is situated in register with said first I/O port, said first radial opening is situated in register with said administering port, and said second radial opening is closed off by the wall of said chamber; and a second link channel in the shape of an upside-down T that is provided with a plurality of radial branches, that has its central branch provided with said fourth I/O port, that has a first one of its radial branches provided with a first radial opening, that has a second one of its radial branches provided with a second radial opening, and that has a third one of its radial branches provided with a third radial opening, said second link channel being arranged so that:

in said first angular position, said first radial opening is situated in register with said second I/O port and said second and third radial openings are closed off by the wall of said chamber;

in said second angular position, said second radial opening is situated in register with said second I/O port and said first and third radial openings are closed off by the wall of said chamber; and in said third angular position, said third radial opening is situated in register with said second I/O port and said second and third radial openings are closed off by the wall of said chamber.

6. A directional control valve according to claim 5, characterized in that:

axes of said second and third radial openings of said first link channel, and said first I/O port lie in a first radial plane (R1);

axes of said first, second and third radial openings of said second link channel, and said second I/O port lie in a second radial plane (R2); and axis of said first radial opening of said first link channel and said administering port lie in a third radial plane (R3) distinct from said first and second radial planes (R1, R2).

7. A directional control valve according to claim 5, characterized in that:

said first and second I/O ports and said administering port are substantially situated in the same midplane (P1) of said body, and said first link channel is situated in a first axial plane (A1) of said spool so that going between said first and second angular positions is obtained by turning said spool through a half-turn in said body; and said first and third radial openings of said second link channel are situated in a second axial plane (A2) of said spool and said second radial opening is situated in a third axial plane (A3) of said spool that is angularly offset by about 90° relative to said second axial plane (A2) so that going between said first and third positions and going between said second and third positions is obtained by turning said spool through respective quarter-turns in said body.

8. A directional control valve according to claim 5, characterized in that:

axes of said first and third radial openings of said first link channel, and said first I/O port lie in a first radial plane (R1);

axes of said first, second and third radial openings of said second link channel, and said second I/O port lie in a second radial plane (R2); and axis of said second radial opening of said first link channel and said administering port lie in a third radial plane (R3) distinct from said first and second radial planes (R1, R2).

9. A directional control valve according to claim 2, characterized in that it further comprises an annular seal provided between said spool and said body, said annular seal having a solid portion through which orifices pass that are designed to be in register with said first radial opening, said second radial opening, and said third radial opening of said first link channel, with said first radial opening, said second radial opening, and said third radial opening of said second link channel, and with said first radial opening and said second radial opening of said third link channel, said solid portion being arranged to provide selective sealing between said link channels.

10. An in-situ making-up and administering apparatus for making up in situ and for administering a solution obtained by mixing two ingredients coming from first and second reservoirs, said in-situ making-up and administering apparatus including a directional control valve according to claim 1, motor-drive means for driving said spool, a fluid-flow circuit element arranged to interconnect said first and second I/O ports and said first reservoir, and a feed pump connected to said fluid-flow circuit element.

* * * * *